United States Patent
Rutherford

(10) Patent No.: US 6,244,537 B1
(45) Date of Patent: Jun. 12, 2001

(54) APPARATUS FOR OPERATING A WING IN THREE MODES AND SYSTEM OF USE

(76) Inventor: John W. Rutherford, 12652 E. Turquoise Ave., Scottsdale, AZ (US) 85259-5227

( * ) Notice: Subject to any disclaimer, the term of this patent is extended or adjusted under 35 U.S.C. 154(b) by 0 days.

(21) Appl. No.: 09/247,423

(22) Filed: Feb. 10, 1999

(51) Int. Cl.[7] .............................. B64C 27/24; B64C 27/52
(52) U.S. Cl. ............................................. 244/7 A; 244/49
(58) Field of Search ................................. 244/2, 6, 7 R, 244/7 A, 49

(56) References Cited

U.S. PATENT DOCUMENTS

| | | |
|---|---|---|
| 1,503,950 | 8/1924 | Heywood . |
| 1,557,789 | 10/1925 | Bane . |
| 1,622,138 | 3/1927 | Ellerman . |
| 1,688,186 | 10/1928 | Humphreys . |
| 2,076,327 | 4/1937 | von Stackelberg . |
| 2,518,007 | 8/1950 | Herrick . |
| 2,628,792 | 2/1953 | Griffith . |
| 2,653,779 | 9/1953 | Terry . |
| 2,879,013 | 3/1959 | Herrick . |
| 3,116,036 | 12/1963 | Nichols ................................ 244/7 A |
| 3,261,572 | * 7/1966 | Gorton ................................. 244/2 |
| 3,516,624 | * 6/1970 | Crook ................................... 244/2 |
| 3,721,403 | * 3/1973 | Gray et al. ........................... 244/7 |
| 4,447,025 | 5/1984 | Bock et al. .................... 244/118.2 |
| 4,592,525 | 6/1986 | Madderra et al. .................. 244/3.28 |
| 4,842,218 | 6/1989 | Groutage et al. .................. 244/3.28 |
| 5,454,530 | 10/1995 | Rutherford et al. ................ 244/7 A |

* cited by examiner

Primary Examiner—Robert P. Swiatek
(74) Attorney, Agent, or Firm—Edwin A. Suominen; Stuart A. Whittington; David E. Rogers

(57) ABSTRACT

An apparatus that permits a rotatable wing to be operated in three modes: a first orientation mode, a second orientation mode, and a mode in which the wing rotates (called the rotating mode). The apparatus permits the wing to be stowed and used in both fixed-wing flight and rotary wing flight. The apparatus may be a component of an aircraft capable of fixed-wing flight with a fuselage oriented generally in the direction of flight. In the first orientation mode, the wing is generally parallel to the orientation of the fuselage, providing a relatively compact stowage configuration. In the second orientation mode, the wing is generally perpendicular to the orientation of the fuselage. The first orientation mode thus facilitates stowage of the wing during stowed flight of such an aircraft under power of a host aircraft, the second orientation mode facilitates fixed-wing flight, and the rotating mode facilitates rotating-wing flight. The wing may be started into auto-driven (i.e., autogyro) operation after operating in fixed-wing flight. Once in the wing has fully engaged in self-powered rotation, no torque needs to be applied. Since the motor of the aircraft needs only to move the aircraft's wing between the first and second orientation modes, and into a self-powered rotating mode, the motor may have relatively simple structure.

25 Claims, 7 Drawing Sheets

APPARATUS FOR OPERATING A WING IN THREE MODES AND SYSTEM OF USE

BACKGROUND OF THE INVENTION

It is generally known for an aircraft to have a wing capable of being operated or oriented in two modes. Such an arrangement permits the wing to be suitably arranged for two modes of an aircraft's operation. When an aircraft is to be stowed for delivery, for example, it is generally desirable for the wing to be fixed in an orientation that is parallel to the orientation of the aircraft's fuselage. When an aircraft is to be flown at relatively high airspeed, it is generally desirable for the wing to be fixed in an orientation that is perpendicular to the direction of flight. When maneuverability at low airspeed or loitering around a fixed location is desired, a rotating wing configuration is generally preferable over a fixed-wing configuration.

In the field of air-launched vehicles for payload deployment, for example, an air-launched flying vehicle having a dual-mode wing is known. This vehicle is designed to be delivered into flight by a host aircraft and then released. The wing of this flying vehicle is oriented parallel to the orientation of its fuselage during delivery, and oriented perpendicular to its fuselage after the vehicle has been released. However, this vehicle lacks provisions for rotating-winged flight. An example, a flying vehicle for payload deployment is disclosed in U.S. Pat. No. 4,842,218, issued to Groutage et al. on Jun. 27, 1989.

In the field of rotary wing craft, aircraft have been long known that operate in both fixed-wing flight and rotary-wing flight. However, such aircraft lack provisions for orienting the wing parallel to the orientation of the aircraft's fuselage. An example of a flying vehicle for conversion from fixed-wing flight to rotating-wing flight (and vice versa) while in the air is disclosed in U.S. Pat. No. 2,518,007, issued to Herrick on Aug. 8, 1950. The vehicle is disclosed as including a convertible wing that could be auto driven by the air or driven from a suitable engine. Herrick, col. 4, lines 65–67.

SUMMARY OF THE INVENTION

An apparatus according to various aspects of the present invention permits a rotatable wing to be operated in three modes: a first orientation mode, a second orientation mode, and a mode in which the wing rotates (called the rotating mode). Such an apparatus permits a wing to be stowed and used in both fixed-wing flight and rotary wing flight.

According to one aspect of the invention, the apparatus is a component of an aircraft capable of fixed-wing flight. Such an aircraft has a fuselage that is oriented generally in the direction of flight. In the first orientation mode, the wing is generally parallel to the orientation of the fuselage, providing a relatively compact stowage configuration. In the second orientation mode, the wing is generally perpendicular to the orientation of the fuselage. The first orientation mode thus facilitates stowage of the wing during stowed flight of such an aircraft under power of a host aircraft, the second orientation mode facilitates fixed-wing flight, and the rotating mode facilitates rotating-wing flight.

Stowed flight permits an aircraft to be transported longer distances than may be possible under the aircraft's power alone. Fixed-wing flight permits the aircraft to attain higher airspeed at higher efficiency than would be ordinarily possible in rotary-wing flight. Rotary-wing flight facilitates safe and convenient recovery of the aircraft within a relatively small area.

According to another aspect of the present invention, a wing may be started into auto-driven (i.e., autogyro) operation after operating in fixed-wing flight. When the wing is within the operating parameters for such a self-powered rotating mode, no torque needs to be applied to maintain its rotation. An aircraft in accordance with this aspect of the invention need not include an anti-torque device to keep the aircraft from rotating in counter action to its rotating wing. Since a motor of such an aircraft needs only to move the aircraft's wing between the first and second orientation modes, and into a self-powered rotating mode, such a motor may have relatively simple structure.

By permitting a wing to be operated in three modes, an apparatus according to various aspects of the present invention may be advantageously used, for example, in an aircraft that is capable of being (1) delivered by host aircraft, (2) deployed into fixed-wing flight, and (3) recovered after a period of rotating-wing flight at lower airspeed than is typically possible in fixed-wing flight. During stowage and delivery, the wing may be oriented parallel to the fuselage of the aircraft. When flight at relatively high airspeed is desired, the wing may be oriented perpendicular to the direction of forward motion. When flight at relatively low airspeed or loitering around a fixed location is desired, for example during recovery of the aircraft, the wing may be permitted to rotate.

According to another aspect of the present invention, such an aircraft need not contain any accommodation for a human pilot. Such a variation may be advantageously used, for example, to permit the fuselage to be made compact to the point where it may have insufficient volume to accommodate a human pilot of average size. A compact aircraft generally requires less fuel to operate and can be made less conspicuous than a less compact aircraft.

In accordance with a method of the present invention, an air-launched flying vehicle (e.g., an aircraft in accordance with various aspects of the invention) is provided that is unmanned, recoverable, and suitable for activities such as munitions deployment and aerial reconnaissance. Such a vehicle has a wing suitable for operation in a stowed configuration, a fixed-wing configuration, and a rotating configuration. According to the method, a host aircraft is also provided, and the vehicle is secured to the host aircraft. The host aircraft is used to transport the vehicle to a first airborne location. During transport, the wing of the air-launched flying vehicle is in the stowed configuration.

At the first airborne location, the air-launched vehicle is released from the host aircraft. The air-launched flying vehicle flies to a second airborne location with its wing in the fixed-wing configuration. At the second airborne location, activities such as munitions deployment or aerial reconnaissance may be performed using the air-launched vehicle. In accordance with various methods of the present invention, the air-launched vehicle flies to a ground-based location with its wing in the rotatable configuration.

BRIEF DESCRIPTION OF THE DRAWING

Embodiments of the present invention will now be described with reference to the drawing, wherein like designations denote like elements, and.

DESCRIPTION OF PREFERRED EXEMPLARY EMBODIMENTS

Figure 1:
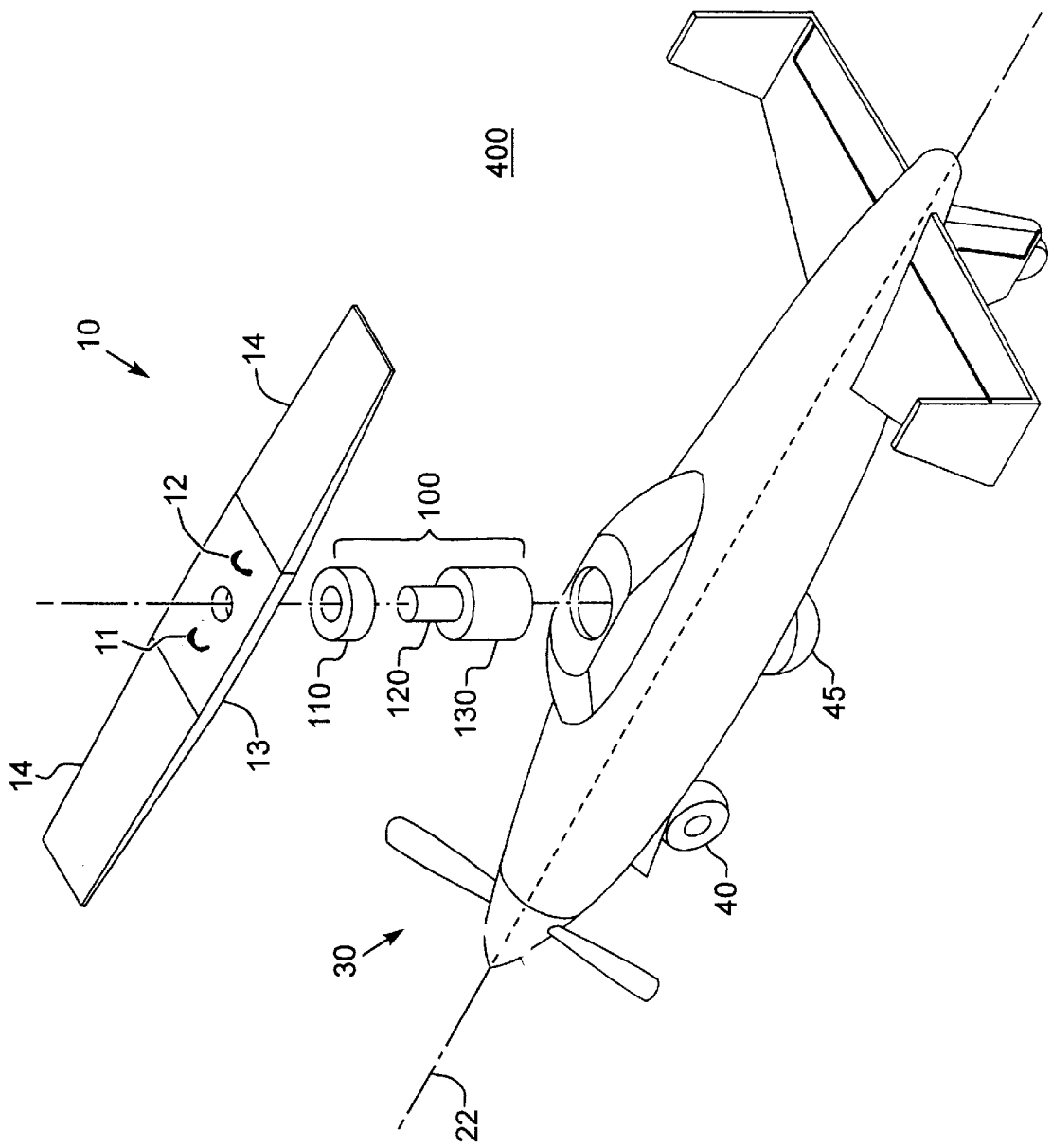
FIG. 1 is a perspective view of an apparatus for operating a rotatable wing according to the present invention.

As illustrated generally in FIG. 1, an apparatus 100 in accordance with various aspects of the present invention includes a lock 110 and a motor 130, which are coupled to each other and to a wing 10 by a shaft 120. Wing 10 is rigid (i.e., not centrifugally stiffened) and comprises a center section 13 and hinged blades 14. Wing 10 is rotatable on shaft 120 except as limited by lock 110. Lock 110 is configured to be selectably coupled to wing 10 such that wing 10 may be operated in either a first orientation mode, a second orientation mode, or a rotating mode. In a variation, fuselage 20 of aircraft 400 acts as a base to support apparatus 100. Aircraft 400 also includes a propeller 30, landing gear 40, and mounting lugs 11 and 12 for attachment to a host aircraft.

Motor 130 is coupled to wing 10 so as to rotate wing 10. A motor of the present invention (e.g., motor 130) includes any device for applying a torsional force to rotate a wing. Motor 130 rotates wing 10 from the first orientation mode (e.g., a stowed position) to the second orientation mode (e.g., a fixed-wing position), and from the second orientation mode to the rotating mode.

Preferably, motor 130 draws energy from a suitable energy source to rotate wing 10. Motor 130 may be configured to replenish energy into such an energy source, for example by rotation of wing 10 in a direction opposite of normal operation. Motor 130 may be further configured not to apply any significant torque to wing 10 when wing 10 is within the operating parameters for the rotating mode. In such an arrangement, motor 130 serves to start wing 10 into conventional auto-driven operation (i.e., as an autogyro).

In a preferred embodiment, motor 130 includes a torsional spring that is preferably made of a long, thin segment of stiff resilient material (e.g., spring steel) and wound into a spiral. The outer end of the segment is fixed to a supporting structure (e.g., an enclosure of motor 130). The inner end of the segment is mechanically coupled to shaft 120 through a suitable ratchet mechanism. Such a mechanism permits shaft 120 to turn without torque from motor 130 when wing 10 is within the operating parameters for the rotating mode.

Many variations of motor 130 may be used in apparatus 100 to rotate wing 10. In one such variation, motor 130 includes a turbine, which may be driven by a reservoir of compressed air. In another variation, motor 130 includes an electric motor coupled to a source of electricity. In another variation, motor 130 is a motor of the type described in U.S. Pat. No. 2,518,007, issued Aug. 8, 1950 to Herrick. The portion is the text from col. 5, line 3 through col. 9, line 54 and those portions of the drawing referenced therein are incorporated herein by reference.

A lock of the present invention includes any structure that may be selectably decoupled from a wing and coupled to the wing in at least one locking mode. Such structure permits the wing to operate in at least one mode of orientation or operation, and prevents the wing from operating in at least one other such mode. For example, lock 110 may be selectably decoupled from wing 10 and coupled to wing 10 in at least a first locking mode.

In the first locking mode, wing 10 is restricted from operating in the rotating mode. When coupled to wing 10 in the first locking mode, lock 110 permits wing 10 to operate in the second orientation mode but prevents wing 10 from operating in the rotating mode. When lock 110 is decoupled from wing 10, wing 10 is free to operate in the rotating mode.

Preferably, lock 110 is further configured to be selectably coupled to wing 10 in a second locking mode. Such a second locking mode allows lock 110 to restrict wing 10 from operating in either the rotating mode or the second orientation mode. In variations where lock 110 does not include such a second locking mode, wing 10 may be retained in the first orientation mode by a suitable structure other than lock 110.

When lock 110 is operable in both a first and a second locking mode, motor 130 may be a simple structure (e.g., a torsional spring) that applies a relatively constant torsional force on shaft 120. Lock 110, in the first locking mode, halts rotation of wing 10 once it has traveled from the first orientation mode to the second orientation mode. When lock 110 is further operable in the second locking mode, lock 110 may also prevent wing 10 from rotating out of the first orientation mode. When lock 110 is decoupled from wing 10, torsional force from motor 130 starts wing 10 into conventional auto-driven operation.

Many variations of lock 110 may be used in apparatus 100. In one such variation, lock 110 includes a suitably adapted disk or drum brake of the type conventionally used in automobiles. In such a variation, lock 110 includes conventional calipers, which are electronically controlled by at least a first locking signal and, in a variation, a second locking signal. In a preferred variation, structure 200 is used to perform the function of lock 110.

Figure 2A:
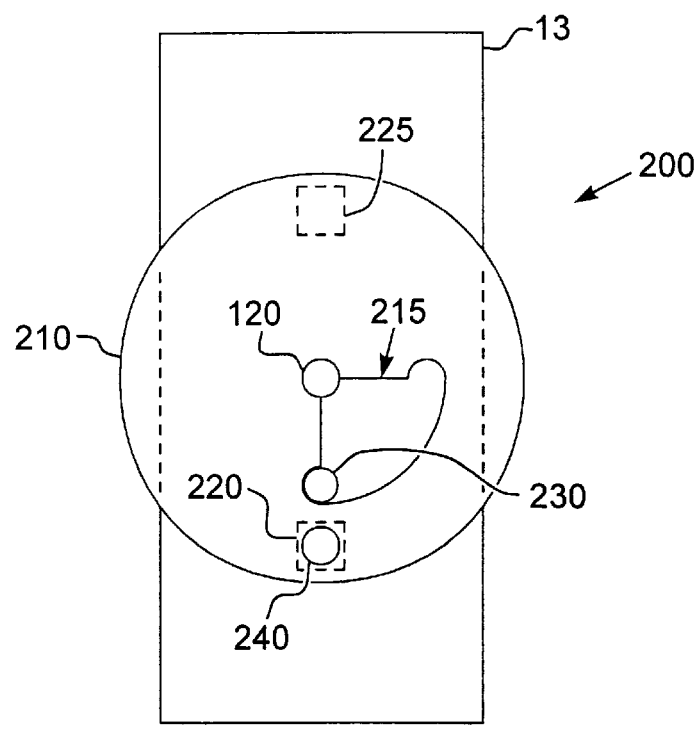
FIGS. 2A and 2B are bottom views of a wing in cooperation with a lock in an embodiment of the present invention.
Figure 2B:
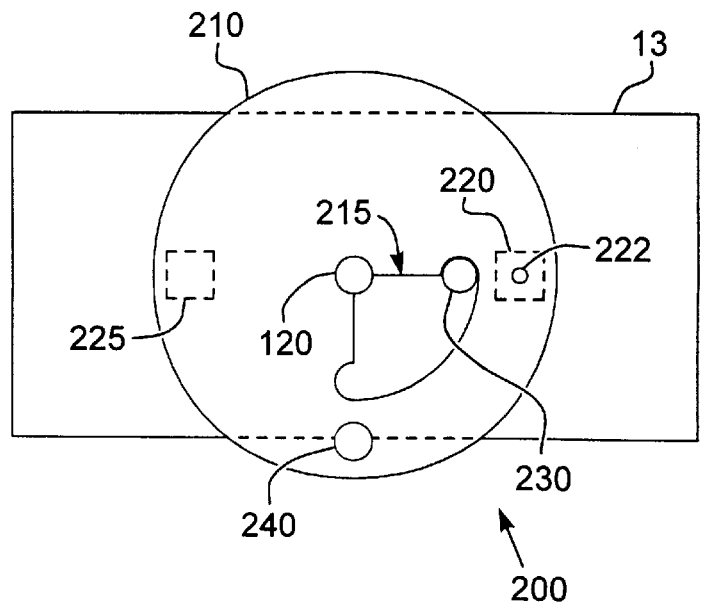
Figure 3:
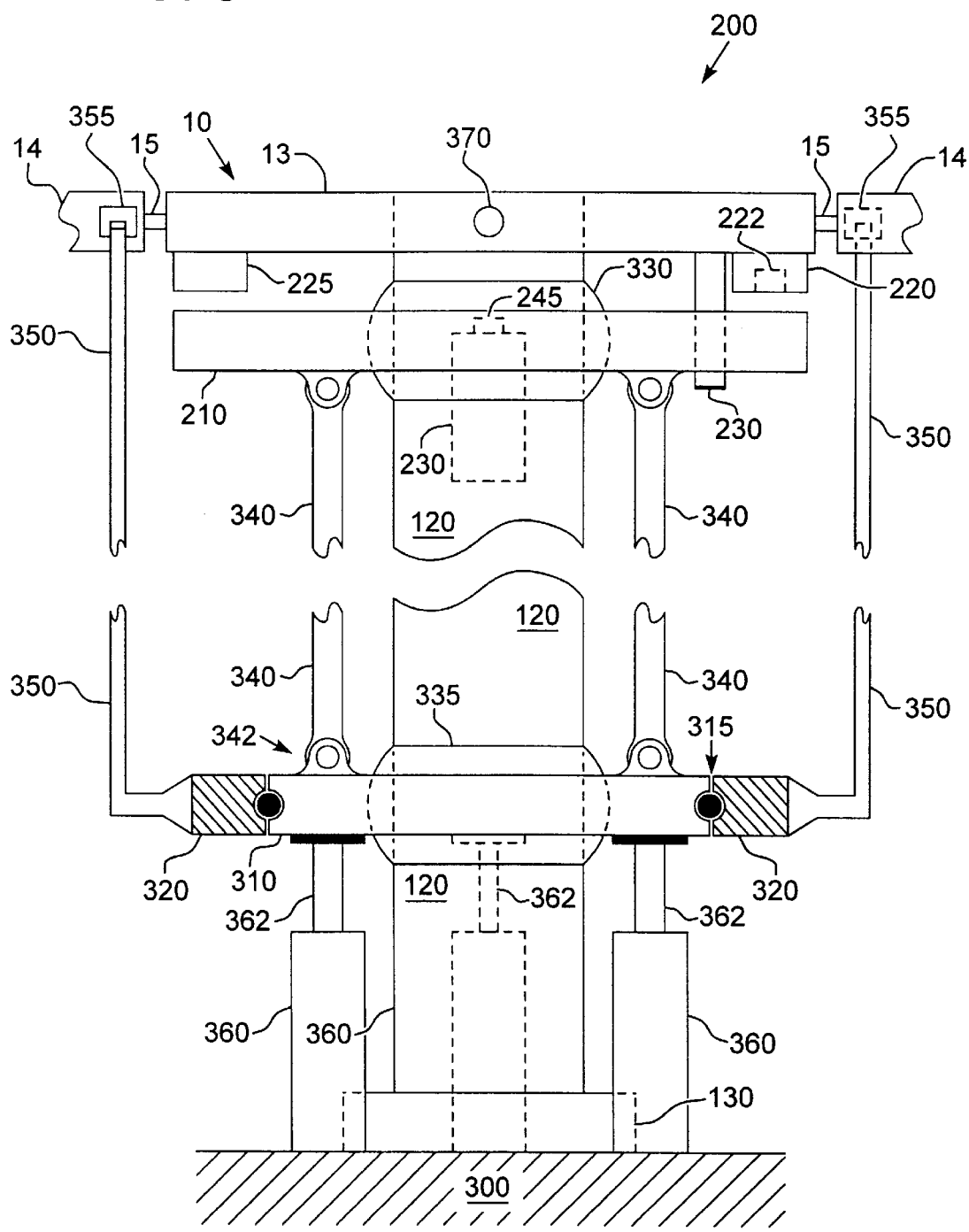
FIG. 3 is a side view of a rotor hub that includes a lock and motor in an embodiment of the present invention.

Structure 200 may be better understood with reference to FIGS. 2A, 2B, and 3. Structure 200 suitably includes a plate 210, referred to as a locking plate. Plate 210 is rotatably coupled to wing 10 by a spherical bearing 330 and shaft 120. Spherical bearing 330 permits plate 210 to be tilted toward any azimuthal direction while shaft 120 remains in a fixed vertical orientation. Bearing 330 also permits plate 210 to be selectably placed in a raised position and a lowered position. Shaft 120 fits into a hole (not shown) in plate 210, with bearing 330 acting as a lubricated medium between them. Bearing 330 permits plate 210 to be tilted, raised, and lowered with respect to shaft 120 by allowing the sides of the hole in plate 210 to slide up and down with respect to shaft 120. Plate 210 is mounted in fixed relation to base 300.

A base of the present invention includes mounting structure to which a wing is rotatably coupled for supporting: (1) a lock of the present invention and (2) wing (through suitable mechanical coupling). For example, base 300 may be a fuselage such as fuselage 20 of aircraft 400. As shown in FIG. 3, the supporting structure (i.e., the enclosure) of motor 130 may be supported by base 300.

Structure 200 further includes a locking pin 230; blocks 220 and 225; an actuator 240 having a plunger 245; a lower plate 310; and actuators 360. Actuator 240 is mounted near the edge of plate 210. Pin 230 is fixedly mounted to the underside of wing 10. Plate 35 is coupled to plate 210 by connecting rods 340 Plunger 245 may be extended or retracted in response to a first locking signal. Plunger 245 extends upwardly, through disk 210, into a recess in block 220.

An actuator of the present invention includes any structure for selectably extending and retracting a plunger (i.e., a coupling shaft) in response to a signal. Suitable actuators include solenoids, pneumatic devices, and hydraulic devices. Suitable solenoids respond to such a signal by electromagnetically retracting the plunger. Suitable pneumatic devices respond to such a signal by regulating the flow of compressed air to a cylinder having a piston, for example, by an electrically operated valve. Suitable hydraulic devices respond to such a signal by regulating the flow of a working fluid, for example, by an electrically operated piston.

Plate 310, conventionally referred to as a non-rotating swash plate, is coupled to shaft 120 by a spherical bearing 335, which operates in a manner similar to bearing 330. When wing 10 and shaft 120 rotate, plates 210 and 310 remain rotationally fixed and separated from shaft 120 by bearings 330 and 335, respectively.

Plates 310 and 210 may be tilted in any direction to facilitate rotary-wing flight. Plates 310 and 210 are coupled to each other by connecting rods 340. Each of rods 340 is connected at both ends by hinges 342. During rotating-wing flight, plate 310 is tilted by actuators 360. Actuators 360 are fixedly mounted to base 300. Tilting forces (i.e., inputs) from actuators 360 are transmitted to the retreating edges of blades 14, causing wing 10 to feather about feathering hinges 15. Inputs from actuators 360 are transmitted through plate 310, an outer ring 320, conventionally referred to as a rotating swash plate, and a plurality of outer connecting rods 350. When plate 310 tilts, wing 10 is tilted by aerodynamic forces along with plate 310. The number of rods 350 corresponds to the number of blades in wing 10. As wing 10 rotates, outer connecting rods 350 and outer ring 320 rotate, separated from plate 310 by a suitable bearing surface (e.g., ball bearings 315).

Motion of wing 10 with respect to shaft 120 is coupled to wing 10 by a teetering hinge 370. Preferably, teetering of wing 10 on hinge 370 is restrained by a set of hub springs (not shown) to provide rotor stability. By teetering on hinge 370 when rotating, wing 10 may be tilted with plate 310 and permit blades 14 to develop a flapping motion, thus facilitating conventional equalization of lift. With such equalization, the retreating edges of blades 14 move up and down. In variations, other techniques for equalization of lift between advancing and retreating blades of wing 10 may be used. For example, the pitch of each blade of wing 10 may be independently controlled.

Figure 7:
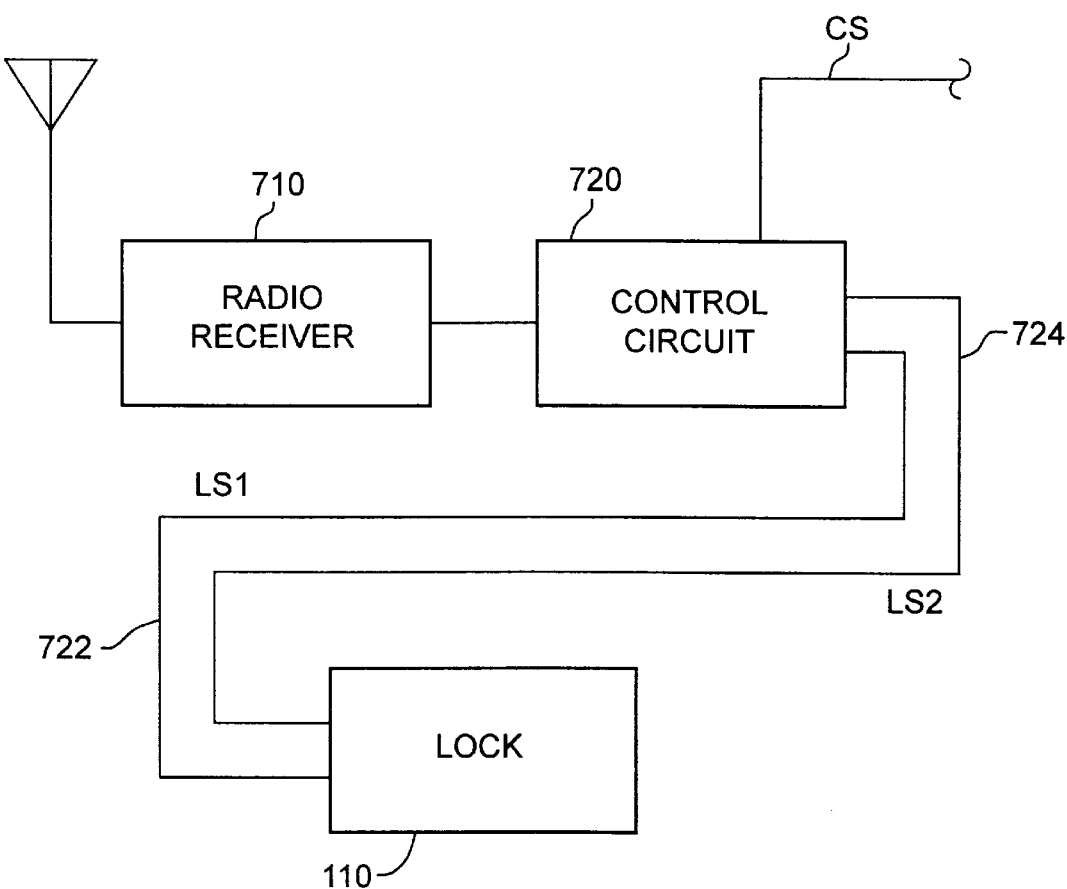
FIG. 7 is a block diagram of a control system for the aircraft of FIGS. 4A and 4B.

The first locking signal (and the second locking signal, when used) may include any signal provided by a control circuit for controlling a lock of the present invention. For example, control circuit 720 (FIG. 7) of aircraft 400 controls lock 110 through a first locking signal LS1 on line 722 and a second locking signal LS2 on line 724. Circuit 720 may provide signals LS1 and/or LS2 according to a stored program. Alternatively, circuit 720 may response to external commands received, for example, by radio receiver 710.

Figure 4A:
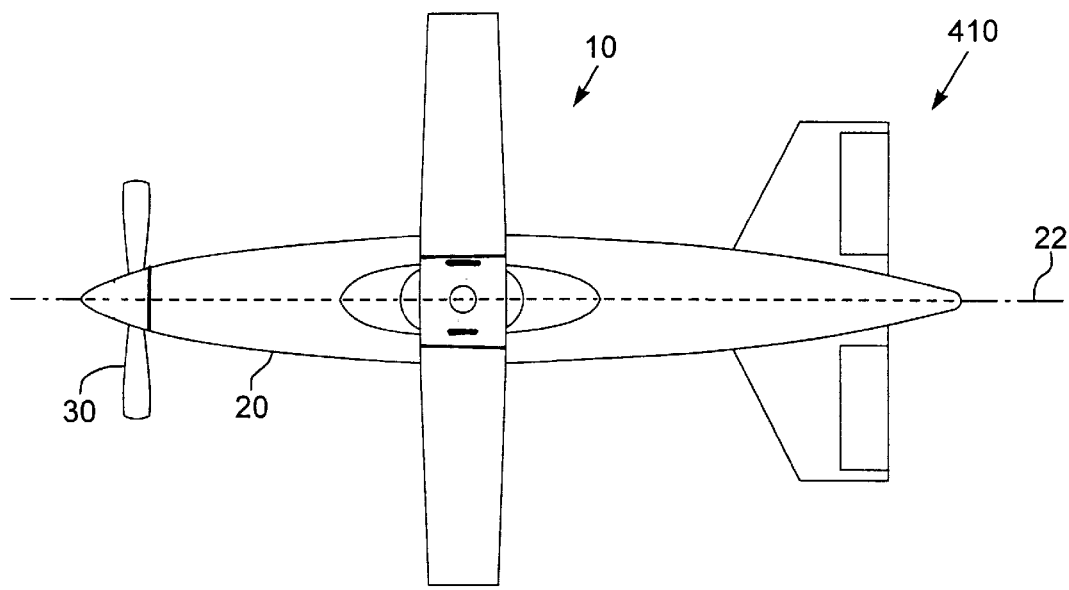
FIG. 4A and FIG. 4B are a top and a side view, respectively, of an aircraft according to the present invention.
Figure 4B:
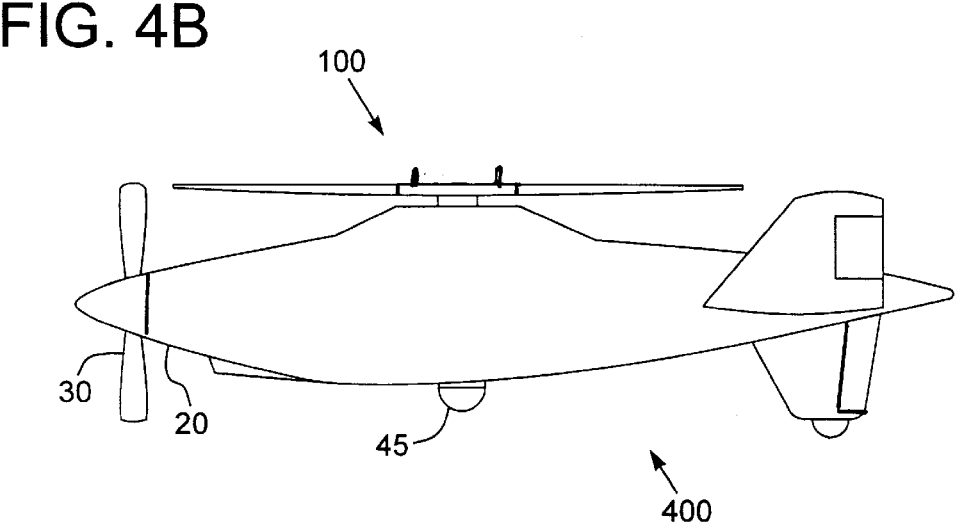

Circuit 720 may also control flight of aircraft 400 having apparatus 100. For example, circuit 720 may send commands to a propulsion device and to conventional control surfaces such as elevons and rudders on a conventional tail section 410 (FIGS. 4A and 4B). Circuit 720 may also control flight of aircraft 400 by imparting a conventional cyclic input or a conventional collective input to wing 10 through actuators 360, as desired. Actuators 360 provide input to wing 10 independently to impart a cyclic input. Actuators 360 impart collective input to wing 10 by acting as a group. Cyclic control is used to move aircraft 400 in a desired direction during rotary-wing flight. When aircraft 400 is to be landed, a cyclical flare may be used to reduce forward velocity. A collective flare may also be used to reduce vertical descent velocity to an acceptable level just before aircraft 400 touches down.

Rotation of wing 10 from the first orientation mode to the second orientation mode may be better understood with reference to FIGS. 2A and 2B. In FIG. 2A, plate 210 is visible beneath center section 13 of wing 10. In FIG. 2A, wing 10 (partially shown) is in an example of the first orientation mode and in FIG. 2A and FIG. 3A, the second orientation mode. Pin 230 is at one end of a cutout 215 in plate 210. In the first orientation mode, actuator 240 is positioned directly beneath recess 222 of block 220. In FIG. 3, actuator 240 is shown behind shaft 120. Plunger 245 (not shown) is extended into block 220, holding it and wing 210 in the first orientation mode.

When actuator 240 retracts plunger 245, block 220 is released. Motor 130 then rotates wing 10 in a counterclockwise direction (as viewed from below) until pin 230 locks against the other side of cutout 215, holding wing 10 in the second orientation mode (FIG. 2B).

To move wing 10 from the second orientation mode into the rotating mode, actuators 360 (shown in FIG. 3) retract their plungers as a group. This action moves plate 210 into a lowered position. In this position, pin 230 (which is fixedly mounted to section 13 of wing 10) pulls free of plate 210. Once pin 230 is free of plate 210, wing 10 is free to rotate and control inputs (collective and cyclic) from actuators 360 may be supplied.

In a preferred embodiment, motor 130 is of a simple structure that applies relatively constant torsional force to wing 10 through shaft 120. In this embodiment, torsional force from motor 130 starts wing 10 into rotation once pin 230 is free of plate 210. Wing 10 becomes auto driven by the air after being started into rotation from fixed-wing flight. Wing 10 preferably operates in fixed-wing flight while in the second orientation mode.

Blocks 220 and 225 provide a mechanical medium between plate 210 and center section 13 of wing 10 when plate 210 is in a raised position for stowage and fixed-wing flight. Actuators 360 may be used to transmit an upward force through connecting rods 340 so that plate 210 provides compression against section 13 of wing 10. Such compression may be advantageously used to stabilize wing 10 when wing 10 is stowed and in fixed-wing flight. The compression is counteracted by tension on shaft 120.

The bearing surface between plate 310 and outer ring 320 includes suitable structure for (1) transmitting tilting forces from plate 310 to wing 10, and (2) permitting ring 320 to rotate with respect to plate 310. Preferably, connecting rods 350 are conventionally constructed of a strong, lightweight material to limit the amount of outward force (and consequent flexion of rods 350) when shaft 120 rotates. Blocks 220 and 225 are preferably made of a suitable low-friction pliable material that permits wing 10 to rotate even if blocks 220 and 225 make contact with plate 210. Shaft 120 is constructed with suitable strength and stiffness to provide structural support for structure 200 and to transmit torque between motor 130 and rotor 10.

Preferably, blades 14 of wing 10 have a symmetrical fore-aft cross-section with blunt leading and trailing edges and a thickness-to-chord ratio of from about 8 to about 12%. The cross-section preferably has an elliptical shape, although other shapes may be used, such as a cross section with a flattened bottom.

The attachment of blades 14 and center section 13 of wing 10 may be better understood with reference to FIG. 3. Blades 14 are coupled to center section 13 via teetering hinges 15. The gap between blades 14 and section 13 is depicted with exaggerated width in FIG. 3 for clarity. Teetering hinges 15 include any suitable structure for permitting blades 14 to rotate within a desired angular range with respect to a longitudinal axis of wing 10 while maintaining overall stiffness of wing 10. Overall stiffness of wing 10 maintains blades 14 in a parallel orientation with respect to the overall longitudinal axis of wing 10 and center section 13.

In a preferred embodiment, shaft 120 is oriented about 5 degrees aft of vertical. Such an orientation permits blades 14 to have a desirable angle of attack in fixed-wing flight. This aft tilt of shaft 120 may also facilitate unpowered rotating-wing flight. Preferably, actuators 360 are able to tilt wing 10 by at least 10 degrees in any azimuthal direction. Actuators 360 may be used to perform both a conventional cyclic flare and a conventional collective flare, as desired.

An aircraft of the present invention includes any flying vehicle that may be stowed, flown as a fixed-wing aircraft, and flown as a rotating-wing aircraft. Aircraft 400, for example, may be better understood with reference to FIGS. 4A and 4B. As discussed above, aircraft 400 suitably includes fuselage 20 having a longitudinal axis 22; wing 10; a propulsion device (e.g., propeller 30); landing gear 40 (not shown in FIG. 4B); and apparatus 100 for operating wing 10 in the first or second orientation mode, or the rotating mode. Aircraft 400 also includes conventional tail section 410.

Figure 5:
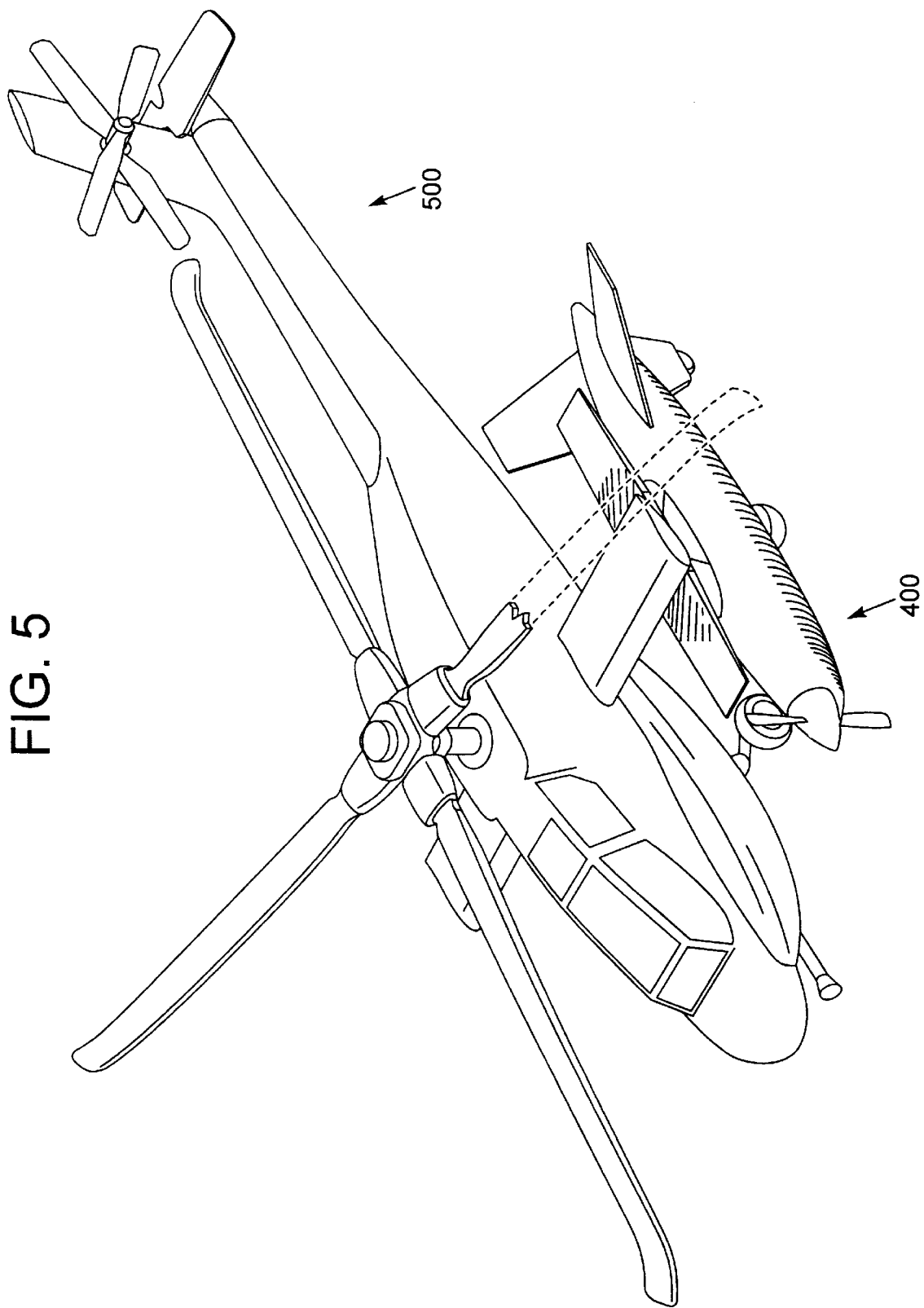
FIG. 5 is a side view of the aircraft of FIGS. 4A and 4B, stowed for transport by a host aircraft.
Figure 6:
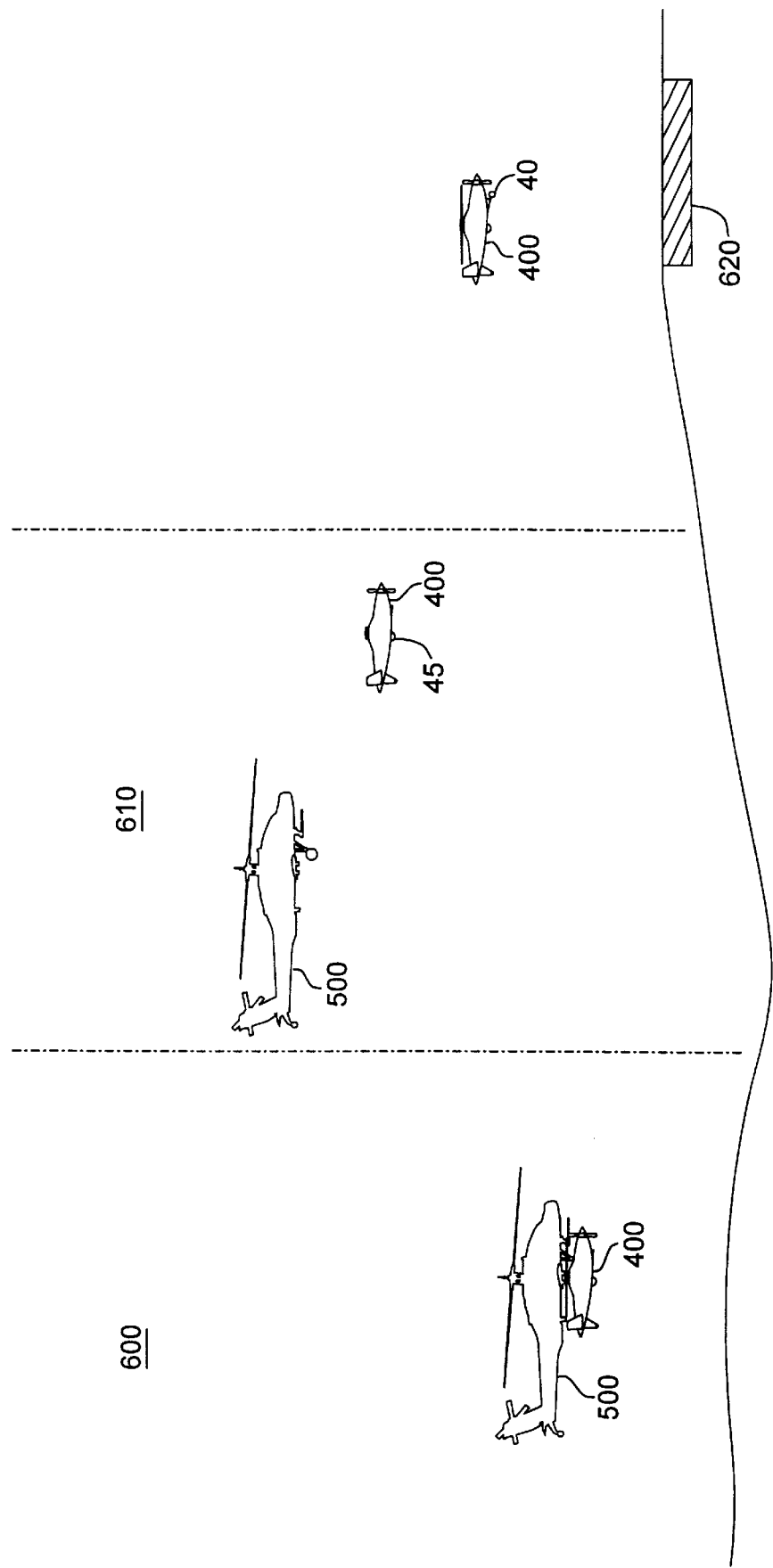
FIG. 6 is a sequential diagram of a method according to the present invention.

In FIGS. 1, 4A, and 4B, tail section 410 is depicted as having outboard vertical fins and a rear wheel at the bottom of a vertical stabilizer. In FIGS. 5 and 6, tail section 410 is depicted as having such a vertical stabilizer and two diagonal fins. A canard may also be employed with or in place of a conventional empennage, if desired.

Many variations of aircraft 400 may be used. For example, a turbofan or turbojet engine may be used for a propulsion device; the propulsion device may be in a "pusher" configuration rather than a "tractor" configuration; the fuselage may be an open frame; and landing gear 40 may be a non-retractable-wheel, flotation, skid or ski apparatus. In one variation, fuselage 20 of aircraft 400 is made compact to the point where it cannot contain a human pilot. In a variation of aircraft 400 having no accommodation for a human pilot, control circuit 720 may control flight of aircraft 400.

A method of the invention for aerial reconnaissance includes stowed flight, fixed-wing flight, and rotating-wing flight. According to the method, a flying vehicle (e.g., aircraft 400) is provided that is unmanned, recoverable, and suitable for aerial reconnaissance. Such a vehicle has a wing suitable for operation in a stowed configuration, a fixed-wing configuration, and a rotating configuration. The vehicle is secured by any suitable means to a provided host aircraft (e.g., host aircraft 500 of FIG. 5) for transport to a first airborne location.

For example, as shown in FIG. 6, aircraft 400 is transported to a first airborne location 600 by host aircraft 500. Wing 10 of aircraft 400 includes mounting lugs 11 and 12 for attachment to a weapons pylon of host aircraft 500. Wing 10 of aircraft 400 is in the stowed configuration. Aircraft 500 releases aircraft 400, which flies under its own power to a second airborne location 610.

In FIG. 6, host aircraft 500 is shown directly behind aircraft 400 at location 610. Aircraft 500 is free to fly independently of aircraft 400 as soon as it releases aircraft 400. However, it may be desirable for a human operator in aircraft 500 to remain close to aircraft 400 if the operator is remotely controlling aircraft 400 under visual observation.

In a variation, a human operator in aircraft 500 may control aircraft 400 using way points displayed on a digital map in aircraft 500. In such a variation, the human operator does not need to visually observe aircraft 400. Accordingly, aircraft 500 may return to a base location after aircraft 400 has been released. Any suitable remote control system may be used for control of aircraft 400 after it has been released.

At location 610, aerial reconnaissance is performed using aircraft 400. Aerial reconnaissance includes any operation to be performed by an aircraft at a generally defined airborne location. For example, aircraft 400 may deploy munitions or gather intelligence at location 610.

Aircraft 400 preferably flies to the vicinity of a ground-based location 620 with wing 10 in a fixed configuration. Upon reaching the vicinity of location 620, wing 10 converts to a rotatable configuration, preferably as an autogyro. By descending to location 620 in rotating-wing flight, aircraft 400 may land in a relatively small area. In a variation, aircraft 400 flies the majority of the distance between locations 610 and 620 with wing 10 in a rotatable configuration.

While the present invention has been described in terms of preferred embodiments and generally associated methods, it is contemplated that alterations and permutations thereof will become apparent to those skilled in the art upon a reading of the specification and study of the drawings. The present invention is not intended to be defined by the above description of preferred exemplary embodiments or by information incorporated herein by reference. Rather, the present invention is defined variously by the appended claims. Each variation of the present invention is intended to be limited only by the recited limitations of its respective claim, and equivalents thereof, without limitation by terms not present therein.

What is claimed is:

1. An aircraft that may be stowed, flown as a fixed-wing aircraft, and flown as a rotating-wing aircraft, the aircraft comprising:

(a) a fuselage having a longitudinal axis;

(b) a radio receiver and a controller cooperatively arranged so as to permit control of the flight of the aircraft from a remote location;

(c) a wing rotatably mounted with respect to the longitudinal axis;

(d) a motor coupled to the wing so as to rotate the wing;

(e) a lock, configured to be selectably decoupled from the wing and coupled to the wing in a first locking mode, such that:

(1) when coupled to the wing in the first locking mode, the lock permits the wing to be oriented perpendicular to the longitudinal axis but prevents the wing from freely rotating; and (2) when decoupled from the wing, the lock permits the wing to freely rotate; and (f) a lock controller for selectably coupling and decoupling the lock to the wing.

2. The apparatus of claim 1 wherein the motor does not apply torque to the wing after completion of the transition from the second orientation mode to the rotating mode.

3. The aircraft of claim 1 wherein the lock is further configured to be selectably coupled to the wing in a second locking mode, such that, when coupled to the wing in the second locking mode, the lock permits the wing to be oriented parallel to the longitudinal axis but prevents the wing from being either oriented perpendicular to the longitudinal axis or freely rotating.

4. The aircraft of claim 3 wherein:
  (a) the lock is further configured to be selectably coupled to the wing in a second locking mode, such that, when coupled to the wing in the second locking mode, the lock:
    (1) does not prevent the wing from being oriented parallel to the longitudinal axis;
    (2) prevents the wing from being oriented perpendicular to the longitudinal axis; and
    (3) prevents the wing from freely rotating; and
  (b) the lock is so configured by further comprising a second actuator, arranged to selectably place the plate in a raised position and a lowered position, with respect to the fuselage, in response to a second locking signal, whereby the plate may be placed in a lowered position to permit the wing to freely rotate.

5. The aircraft of claim 4 wherein the lock is arranged to selectably place the plate in a compressed position with respect to the wing, to stabilize the wing.

6. The aircraft of claim 4 further comprising a control circuit to provide the first and second locking signals.

7. The aircraft of claim 1 wherein the lock comprises:
  (a) a plate mounted such that the plate is prevented from rotating with respect to the fuselage and such that the plate may be selectably placed in a raised position and a lowered position, with respect to the fuselage, the plate being keyed to receive a pin and rotatably mounted with respect to the wing;
  (b) a block fixedly mounted to the underside of the wing;
  (c) a first pin fixedly mounted to the underside of the wing such that the pin locks against the plate, when the plate is in the raised position, upon re-orientation of the wing from being parallel to being perpendicular to the longitudinal axis, thereby preventing the wing from freely rotating; and
  (d) a first actuator fixedly mounted with respect to the fuselage, having a body and a first pin extending upwards toward the wing, the first pin being selectably extended from the body and retracted into the body in response to a first locking signal, the first actuator being arranged beneath the wing such that the pin secures the block when:
    (1) the pin is extended; and
    (2) the wing is oriented parallel to the longitudinal axis.

8. The aircraft of claim 7 further comprising landing gear, whereby the apparatus is further configured to undergo a landing and a recovery after the descent.

9. An apparatus for operating a rotatable wing in a mode selected from a first orientation mode, a second orientation mode, and a rotating mode, the apparatus comprising:
  a motor coupled to the wine so as to rotate the wing; and
  a lock, configured to be selectable decoupled from the wing and coupled to the wing in a first locking mode and a second locking mode, such that:
    when coupled to the wing in the first locking mode, the lock permits the wing to operate in the second orientation mode but prevents the wing from operating in the rotating mode;
    when coupled to the wing in the second locking mode, the lock permits the wing to operate in the first orientation mode but prevents the wing from operating in either the second orientation mode or the rotating mode; and
    when decoupled from the wing, the lock permits the wing to operate in the rotating mode; wherein the motor does not apply torque to the wing after completion of the transition from the second orientation mode to the rotating mode, and wherein the motor comprises a torsional spring.

10. An apparatus for operating a rotatable wing in a mode selected from a first orientation mode, a second orientation mode, and a rotating mode the apparatus comprising:
  a motor coupled to the wing so as to rotate the wing;
  a lock, configured to be selectably decoupled from the wing and coupled to the wing in a first locking mode and a second locking mode, such that, when coupled to the wing in the first locking mode, the lock permits the wing to operate in the second orientation mode but prevents the wing from operating in the rotating mode, when coupled to the wing in the second locking mode, the lock permits the wing to operate in the first orientation mode but prevents the wing from operating in either the second orientation mode or the rotating mode, and when decoupled from the wing, the lock permits the wing to operate in the rotating mode;
  a lock controller for selectably coupling and decoupling the lock to the wing, whereby the apparatus is configured to undergo a stowed flight under power of a separate aircraft, followed by a self-powered flight, followed by a descent, the wing being oriented in the first orientation mode during stowed flight, in the second orientation mode during at least a portion of the self-powered flight, and in the rotating mode during at least a portion of the descent;
  landing gear, whereby the apparatus is further configured to undergo a landing and recovery after descent; and
  a radio receiver and a control circuit cooperatively arranged so as to permit control of the flight of the apparatus from a remote location.

11. An apparatus for operating a rotatable wing in a mode selected from a first orientation mode, a second orientation mode, and a rotating mode, the apparatus comprising:
  a motor coupled to the wing so as to rotate the wing;
  a lock, configured to be selectably decoupled from the wing and coupled to the wing in a first locking mode and a second locking mode, such that, when coupled to the wing in the first locking mode, the lock permits the wing to operate in the second orientation mode but prevents the wing from operating in the rotating mode, when coupled to the wing in the second locking mode, the lock permits the wing to operate in the first orientation mode but prevents the wing from operating in either the second orientation mode or the rotating mode, and when decoupled from the wing, the lock permits the wing to operate in the rotating mode;
  a lock controller for selectably coupling and decoupling the lock to the wing, whereby the apparatus is configured to undergo a stowed flight under power of a separate aircraft, followed by a self-powered flight, followed by a descent, the wing being oriented in the first orientation mode during stowed flight, in the second orientation mode during at least a portion of the self-powered flight, and in the rotating mode during at least a portion of the descent;
landing gear, whereby the apparatus is further configured to undergo a landing and recovery after descent, wherein the fuselage contains no accommodation for a human pilot.

12. The apparatus of claim 11 wherein the fuselage has insufficient volume to accommodate a human pilot of average size.

13. Apparatus for operating a rotatable wing in a mode selected from a first orientation mode, a second orientation mode, and a rotating mode, the apparatus comprising:
  (a) a motor coupled to the wing so as to rotate the wing;
  (b) a base, the wing being rotatably coupled to the base; and
  (c) a lock, configured to be selectably decoupled from the wing and coupled to the wing in a first locking mode, the lock comprising:
    (1) a plate mounted such that the plate is prevented from rotating with respect to the fuselage and such that the plate may be selectably placed in a raised position and a lowered position, with respect to the fuselage, the plate being keyed to receive a pin and rotatably mounted with respect to the wing;
    (2) a block fixedly mounted to the underside of the wing;
    (3) a first pin fixedly mounted to the underside of the wing such that the pin locks against the plate, when the plate is in the raised position, upon re-orientation of the wing from being parallel to being perpendicular to the longitudinal axis, thereby preventing the wing from freely rotating; and
    (4) a first actuator fixedly mounted with respect to the fuselage, having a body and a first pin extending upwards toward the wing, the first pin being selectably extended from the body and retracted into the body in response to a first locking signal, the first actuator being arranged beneath the wing such that the pin secures the block when the pin is extended and the wing is oriented parallel to the longitudinal axis.

14. The apparatus of claim 13 wherein:
  (a) the lock is further configured to be selectably coupled to the wing in a second locking mode, such that, when coupled to the wing in the second locking mode, the lock permits the wing to operate in the first orientation mode but prevents the wing from operating in either the second orientation mode or the rotating mode; and
  (b) the lock is so configured by further comprising a second actuator, fixedly mounted with respect to the base, having a body and a second pin extending upwards toward the wing, the second pin being selectably extended from the body and retracted into the body in response to a second locking signal, the second actuator being arranged beneath the wing such that the pin extends to the side of the chock when the pin is fully extended in the first orientation mode.

15. The aircraft of claim 14 wherein the lock is arranged to selectably place the plate in a compressed position with respect to the wing, to stabilize the wing.

16. The apparatus of claim 14 further comprising a control circuit to provide the first and second locking signals.

17. The apparatus of claim 13 wherein the motor does not apply torque to the wing after completion of the transition from the second orientation mode to the rotating mode.

18. A method for aerial reconnaissance, the method comprising:
  (a) providing a flying vehicle that is unmanned, recoverable, and suitable for aerial reconnaissance, the vehicle having a wing suitable for operation in a stowed configuration, a fixed-wing configuration, and a rotating configuration;
  (b) providing a host aircraft, securing the vehicle to the host aircraft, and transporting the vehicle to a first airborne location, using the host aircraft, with the wing in the stowed configuration;
  (c) releasing the vehicle from the host aircraft at the first airborne location;
  (d) flying the vehicle to a second airborne location with the wing in the fixed-wing configuration;
  (e) performing aerial reconnaissance, using the vehicle, at the second airborne location; and
  (f) flying the vehicle to a ground-based location with the wing in the rotatable configuration.

19. The method of claim 18 wherein the method is performed in the sequence recited.

20. An apparatus comprising:
  a rotatable wing operative to be moved in a first orientation mode, a second orientation mode, and a rotating mode;
  a motor coupled to a central portion of said rotatable wing, via a teetering hinge, so as to enable said motor to rotate the rotatable wing; and
  a locking mechanism configured to be selectably decoupled from said rotatable wing and coupled to the wing in a first locking mode and a second locking mode, wherein, when coupled to the rotatable wing in the first locking mode, said locking mechanism permits the rotatable wing to operate in the second orientation mode but prevents the rotatable wing from operating in the rotating mode, when coupled to the rotatable wing in the second locking mode, said locking mechanism permits the rotatable wing to operate in the first orientation mode but prevents the rotatable wing from operating in the second orientation mode and the rotating mode, and when decoupled from the rotatable wing, the locking mechanism permits the rotatable wing to operate in the rotating mode.

21. The apparatus according to claim 20, wherein the first orientation mode facilitates stowage of the rotatable wing during stowed flight of the apparatus under power of a separate aircraft, the second orientation mode facilitates operation of the apparatus in fixed-wing flight, and the rotating mode facilitates operation of the apparatus in rotating-wing flight.

22. The apparatus according to claim 20, wherein the motor is configured to not apply any torque to the rotatable wing after a transition from said second orientation mode to said rotating mode.

23. The apparatus according to claim 20 further comprising a fuselage having a longitudinal axis, wherein the rotatable wing is oriented substantially parallel to the longitudinal axis when in the first orientation mode, and wherein the rotatable wing is oriented substantially perpendicular to the longitudinal axis when in the second orientation mode.

24. The apparatus according to claim 20 further comprising, a lock controller for selectively coupling and decoupling said locking mechanism to the rotatable wing, said lock controller configured to control said rotatable wing in the following flight sequence of said apparatus: a stowed flight under power of a separate aircraft, a self-powered flight, and a descent, wherein said rotatable wing is oriented in the first orientation mode during stored flight, in the second orientation mode during at least a portion of the self-powered flight, and in the rotating mode during at least a portion of said descent.

25. The apparatus according to claim 24, further comprising landing gear, whereby the apparatus is further configured to undergo a landing and recovery after descent.

* * * * *